United States Patent [19]
Brown

[11] Patent Number: 6,101,538
[45] Date of Patent: *Aug. 8, 2000

[54] GENERIC MANAGED OBJECT MODEL FOR LAN DOMAIN

[75] Inventor: David Alan Brown, Essex, United Kingdom

[73] Assignee: British Telecommunications public limited company, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/525,740

[22] PCT Filed: Mar. 7, 1994

[86] PCT No.: PCT/GB94/00429

§ 371 Date: Oct. 18, 1995

§ 102(e) Date: Oct. 18, 1995

[87] PCT Pub. No.: WO94/23514

PCT Pub. Date: Oct. 13, 1994

[30] Foreign Application Priority Data

Mar. 26, 1993 [EP] European Pat. Off. .............. 93302382

[51] Int. Cl.[7] ..................................................... G06F 15/16

[52] U.S. Cl. ........................................... 709/223; 709/249

[58] Field of Search ........................... 395/200.01, 200.1, 395/200.09, 500, 200.79, 200.3; 709/249, 200, 223, 230

[56] References Cited

U.S. PATENT DOCUMENTS 4,607,256  8/1986  Henzel .
4,751,635  6/1988  Kret .
4,787,035  11/1988  Bourne .

(List continued on next page.)

FOREIGN PATENT DOCUMENTS

0434865 A1  7/1991  European Pat. Off. .
2-271754  11/1990  Japan .
3-73049  3/1991  Japan .
4-199933  7/1992  Japan .
4-248724  9/1992  Japan .
4-273634  9/1992  Japan .
4-305752  10/1992  Japan .
5-252159  9/1993  Japan .
7-503117  3/1995  Japan .

OTHER PUBLICATIONS

Warrier et al., "A Platform for Heterogeneous Interconnection Network Management", IEEE Journal on Selected Areas in Communications; p: 119–26, Jan. 1990.

Chow et al., "Achieving Multimedia Communications on a Heterogeneous Network", IEEE journal on Selected Areas in Communications, p: 348–59, Apr. 1990.

Kannai et al, "Method of Translation of Management Information and Protocol in Integrated Network Management system", Papers for National Meeting of the Information Processing Society, Mar. 1992, No. 1, p. 1–109 through p. 1–110.

Cox et al, SNMP Agent Support for SMDS, IEEE Network Magazine, vol. 5, No. 5, Sep. 1991, pp. 33–40.

JPO Official Action dated Sep. 22, 1998.

"Cooperative Management: The Key to Managing Customer Networks", K. J. Willets, *British Telecommunications Engineering*, Vo. 10, Oct. 1991 (pp. 174–179).

(List continued on next page.)

*Primary Examiner*—John A. Follansbee

[57] ABSTRACT

An internetwork system has several interlinked computer networks, each network having an associated element manager which is arranged to communicate with a router via a first network management protocol. Each element manager converts from the first network management protocol to a second protocol and also communicates via the network manager. The network manager allows a user of the system to control a router by issuing a command at the network manager and/or to view information on the status, configuration and/or performance of the router.

10 Claims, 9 Drawing Sheets

U.S. PATENT DOCUMENTS

| | | |
|---|---|---|
| 4,930,071 | 5/1990 | Tou et al. . |
| 4,968,159 | 11/1990 | Sasaki et al. . |
| 4,992,957 | 2/1991 | Aoyama et al. . |
| 5,021,992 | 6/1991 | Kondo . |
| 5,060,140 | 10/1991 | Brown et al. . |
| 5,063,523 | 11/1991 | Vrenjak . |
| 5,086,426 | 2/1992 | Tsukakoshi et al. ............ 370/405 |
| 5,136,523 | 8/1992 | Landers . |
| 5,146,594 | 9/1992 | Iitsuka . |
| 5,165,014 | 11/1992 | Vassar . |
| 5,172,313 | 12/1992 | Schumacher . |
| 5,278,978 | 1/1994 | Demers et al. . |
| 5,301,303 | 4/1994 | Abraham et al. ............ 395/500 |
| 5,452,433 | 9/1995 | Nihart et al. ............ 395/500 |
| 5,471,399 | 11/1995 | Tanaka et al. ............ 364/491 |
| 5,490,252 | 2/1996 | Macera et al. ............ 395/200.79 |
| 5,491,796 | 2/1996 | Wanderer et al. ............ 395/200.09 |
| 5,613,100 | 3/1997 | Anezaki ............ 395/500 |

OTHER PUBLICATIONS

"An Implementation of the Common Network Management Information Service Element Interfaces", N. Modiri, *IEEE Communications Magazaine*, Jul. 1991 (pp. 29–38).

"Management by Proxy Agent", S. R. Reasoner, Network Architect, Newlett–Packard, (pp. 190–195).

Research Reports of the Information Processing Society, MIC–68–3, Jul. 5, 1991 (pp. 1–8) (Japanese lang.).

Technical Research Reports of the Institute of Electronics, Information and Communications Engineering, IN93–131, Feb. 25, 1994, pp. 87–94.

Technical Research Reports of the Institute of Electronics, Information Communications Engineering, IN92–63, Oct. 19, 1992, pp. 19–24.

Oleksiw, "LAN Internetwork Management", IEEE 1992 Network Operations and Management Symposium, New York, US, pp. 556–565, 1992.

Yoda et al, "Configuration of a Local Fiber Optical Network Management System based on Multiple Manager Systems Environment", IEEE 1992 Network Operations and Management Symposium, New York, US, pp. 731–741.

Reasoner, "Management by Proxy Agent", IRE Wescon Convention Record, vol. 35, Nov. 1991, North Hollywood, US, pp. 19–195.

Kauffels, "Schwaches Konzept, Aber Produkte—Und Umgekehrt", Technische Rundschau, vol. 83, No. 24, Jun. 14, 1991, Bern, CH, pp. 40–50, partial translation.

Modiri, "An Implementation of the Common Network Management Information Service Element Interfaces", IEEE Communications Magazine, vol. 29, No. 7, Jul. 1991, Piscataway, NJ, US, pp. 29–38.

Antonelli et al, "A Public Telecom Operator's Point of View for the Integrated Management of Local and Widen Area Networks", SIP –Research & Development, Genoa, Italy, Sept. 28 –Oct. 2, 1992, pp. 357–362.

CCITT X.701, Data Communication Networks, "Information Technology—Open Systems Interconnection—Systems Management Overview", Geneva, 1992, pp. 1–25.

CCITT, X.733, Data Communication Networks, "Information Technology—Open Systems Interconnection—Systems Management: Alarm Reporting Function", Geneva, 1992. pp. 1–18.

CCITT, X.710, Data Communication Networks: Open Systems Interconnection (OSI); Management, "Common Management Information Service Definition for CCITT Applications", Geneva, 1991, pp. 1–33.

CCITT, X.730, Data Communication Networks, "Information Technology—Open Systems Interconnection—Systems Management: Object Management Function" (1992 E), pp. 1–24.

GENERIC MANAGED OBJECT MODEL FOR LAN DOMAIN

BACKGROUND OF THE INVENTION

1. Field of the Invention

The present invention relates to a Generic Managed Object Model for a LAN Domain, and in particular a model which includes the capability of dealing with ports and routers.

2. Related Art

Current systems incorporating managed object models are rather limited as to the amount of control provided to the user, and also the amount of information on the internetwork system which is provided. Currently agreed standards for managed object models are presently inadequate, and there are no agreed standards whatsoever for the interface via which a network manager, controlling an internetwork, may communicate with the individual element managers which form part of the internetwork.

SUMMARY OF THE INVENTION

According to the invention there is provided an internetwork systems comprising a plurality of interlinked computer networks each network having an associated manager arranged to communicate with elements on its respective network via a first network management protocol, and at least some managers including means for converting from the first network management protocol to a second protocol and further including means for communicating via the second protocol with a network manager, the network manager including control and information means arranged to allow a user of the system to control an element by issuing a command at the network manager and/or to view information on the status, configuration and/or performance of the element.

The network manager may include a database, arranged to store a model of the internetwork. The model may be stored as a managed object class model, according to the Common Management Information Protocol (CMIP). As an alternative (but not preferred) embodiment, it could be envisaged that the managers and the network manager might communicate via SNMP, with the conversion from SNMP to CMIP being carried out by the network manager. Also, it would be possible for the managers to communicate with their respective routers and other elements using some protocol other than SNMP. The elements may be routers, bridges, hubs, WAN managers, LAN managers or other elements.

The internetwork may include alarm means for raising an alarm against a particular element and passing that information on to the network manager. Port alarm means may also be provided for raising an alarm against an individual port, or an individual line, or a particular router. The internetwork may also provide means for collecting performance information related to a particular router, and/or for ascertaining the configuration may be passed on to the network manager where it may be displayed graphically, in text from, or by means of auditory alarms. Means may also be provided for controlling a router and/or its ports via the network manager.

BRIEF DESCRIPTION OF THE DRAWINGS

The invention may be carried into practice in a number of waves, and one specific embodiment will now be described, by way of example, with reference to the accompanying drawings in which.

DETAILED DESCRIPTION OF EXEMPLARY EMBODIMENTS

Figure 1:
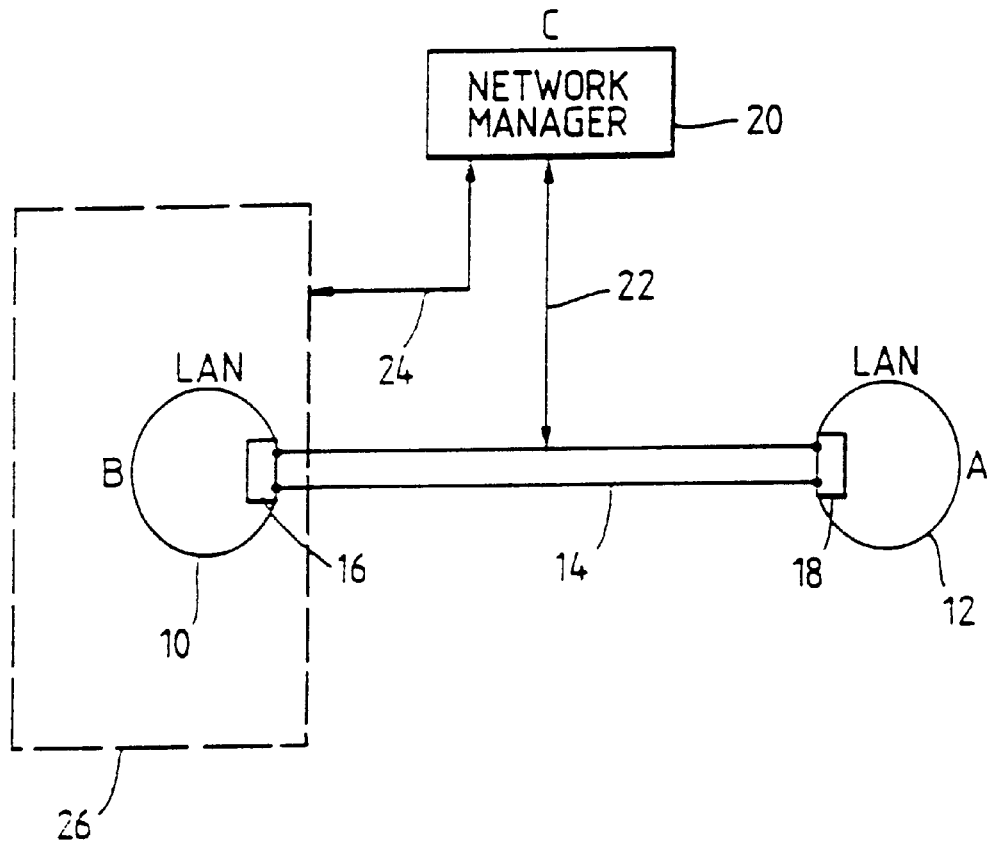
FIG. 1 is a schematic view of an internetwork system as a whole.

Turning first to FIG. 1, an exemplary internetwork system comprises first and second local area networks. 10, 12, linked by appropriate data cabling 14. Each LAN has its own separate proprietary element manager 16, 18. Each LAN may operate according to its own protocol: for example the LAN 10 might use the token ring system and the LAN 12 might be an ethernet set up.

Sitting apart from the internetwork is a network manager 20, which receives information from the internetwork and returns commands, via a link which is schematically illustrated at 22. Information passing along this line actually goes either directly to the element managers 16, 18, or is routed, if appropriate, via the data cables 14 to the element manager. The network manager 20 may also receive information and issue instructions along a further line schematically illustrated at 24 from the "private domain" 26 of the user of the LAN 10. The "private domain" 26 might for example be the privately owned networks and network devices of a particular organization. The data cables 14 might typically be publicly or privately owned cables provided by a telecommunication authority. The LAN 12 might be a public system, or perhaps another private system.

The purpose of the network manager 20 is to give a user of the entire internetwork system, sitting at C, the management information and control he needs to manager the internetwork, For example, the user A of the LAN 12 might be having difficulty in transferring a file from his own workstation to the workstation of B on the LAN 10. The person in charge of the internetwork manager, at C. would have an overview of the entire system and would be able to advise A and B what the problem was and how it might be solved. In a more complicated system (not shown) comprising more than two interlinked LANs, the network manager 20 is able to control the appropriate routers to force data to travel alone a particular path. If the normal data path is unavailable for some reason, because of a fault. the network manager 20 would be able to issue a command to one or more of the routers to transfer the information via a different route.

Figure 2:
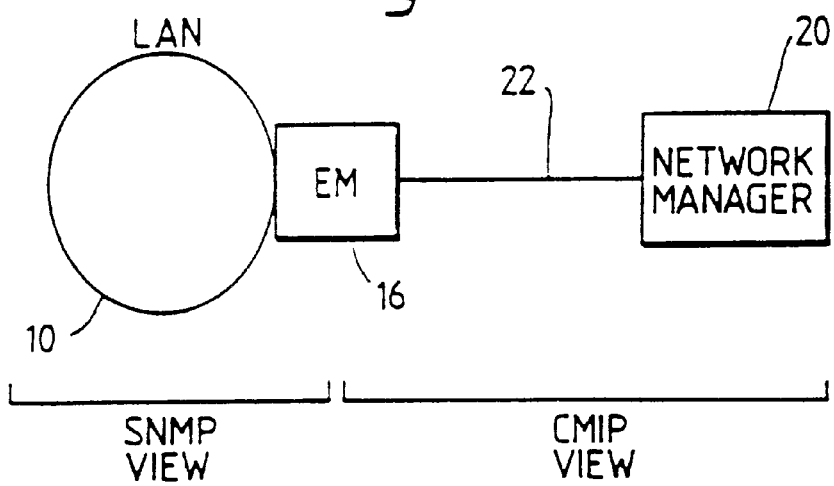
FIG. 2 shows the interface between the network manager and the individual element manager LAN.

It is of course essential that the network manager 20 is able to communicate with each of the individual proprietary element managers. These element managers may be manufactured by different companies and each controls its own individual LAN using SNMP. To ensure well defined communication with the network manager, the present embodiment envisages that each of the proprietary element managers will support CMIP for communicating with the network manager and SNMP for communicating with is own elements. The network manager communicates with the individual element managers using CMIP and a managed object model which is chosen to provide the necessary functionality for the user of the network manager. In the preferred embodiment, the element manager translates the SNMP information into CMIP. This is schematically illustrated in FIG. 2. Both SNMP (Simple Network Management Protocol) and CMIP (Common Management Information Protocol) are protocols which are well known to the skilled man in this field.

The network manager 20 maintains a model of the overall internetwork, essentially by storing information about the physical make up of the internetwork, its status and performance, in a suitably designed form according to the CMIP standard. A suitable network manager for this purpose is the manager known as "Concert IMS" available from British Telecommunications PLC. whose registered office is 81, Newgate Street, London EC1A 7AJ.

The model of the internetwork which is stored within the network manager is based upon managed objects, each of which is effectively a database entry representing a management view of a particular resource. The model provides for individual instances of each particular resource, for example each individual router within the internetwork, and it also provides for classes, for example the class of all routers. In those terms, the model may therefore by thought of as a series of interlinked managed object classes.

Figure 3:
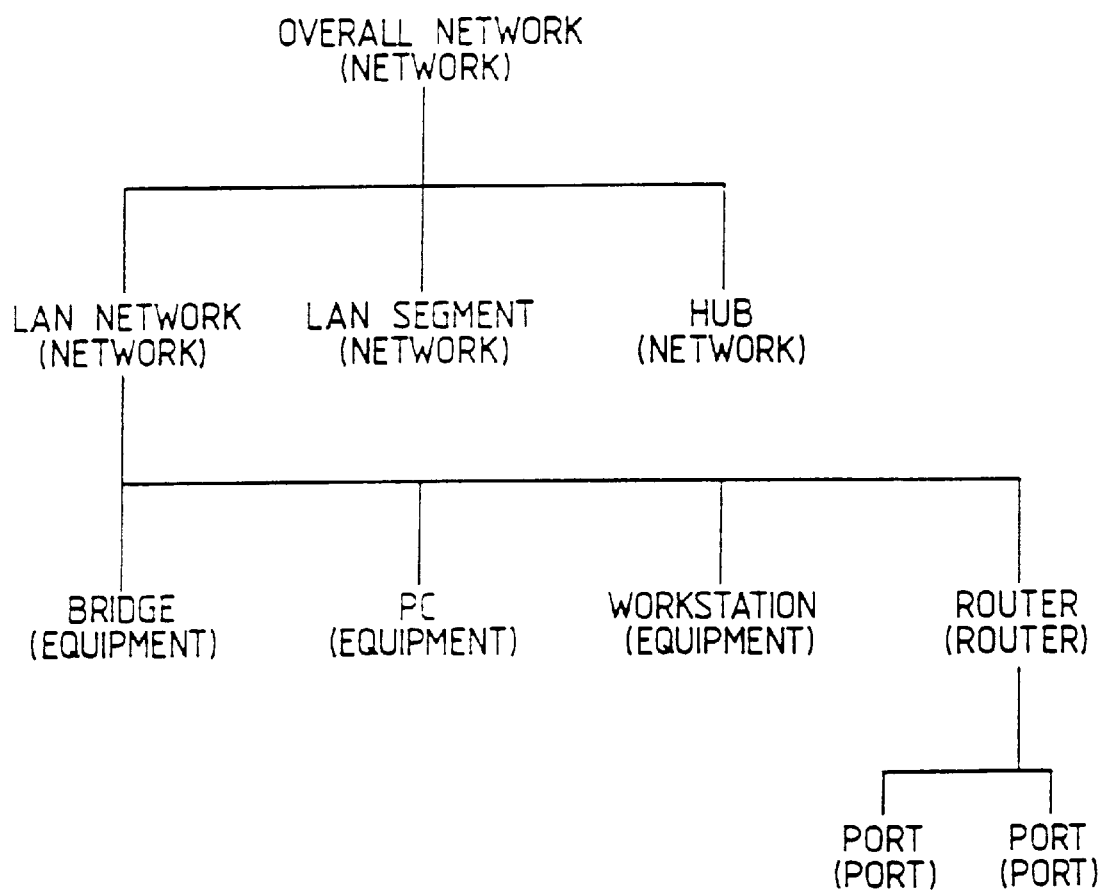
FIG. 3 is an example of how information might be organized within the network manager.

To take a particular example as shown in FIG. 3, one of the managed object classes is called "network" and individual instances within this class might comprise the overall internetwork, an individual LAN network, an individual LAN segment, a hub and so on. The class "network" therefore effectively provides for partitioning the database such that the make-up of the particular internetwork or LAN can be represented as a database template which can be filled in different ways, according to what the particular instance represents. The database entries are linked together hierarchically, as shown in FIG. 3, to indicate for example that the LAN network, the LAN segment and the hub are all individual parts of the overall internetwork.

A further managed object class is called "equipment", which has particular instances including a bridge, a PC and a workstation, all of which are component parts of the LAN network in this example. Another part of the LAN network is a router, which has its own special class called "router". Each router may have several ports (representing individual wires), ports having their own special class called "port".

Figure 4:
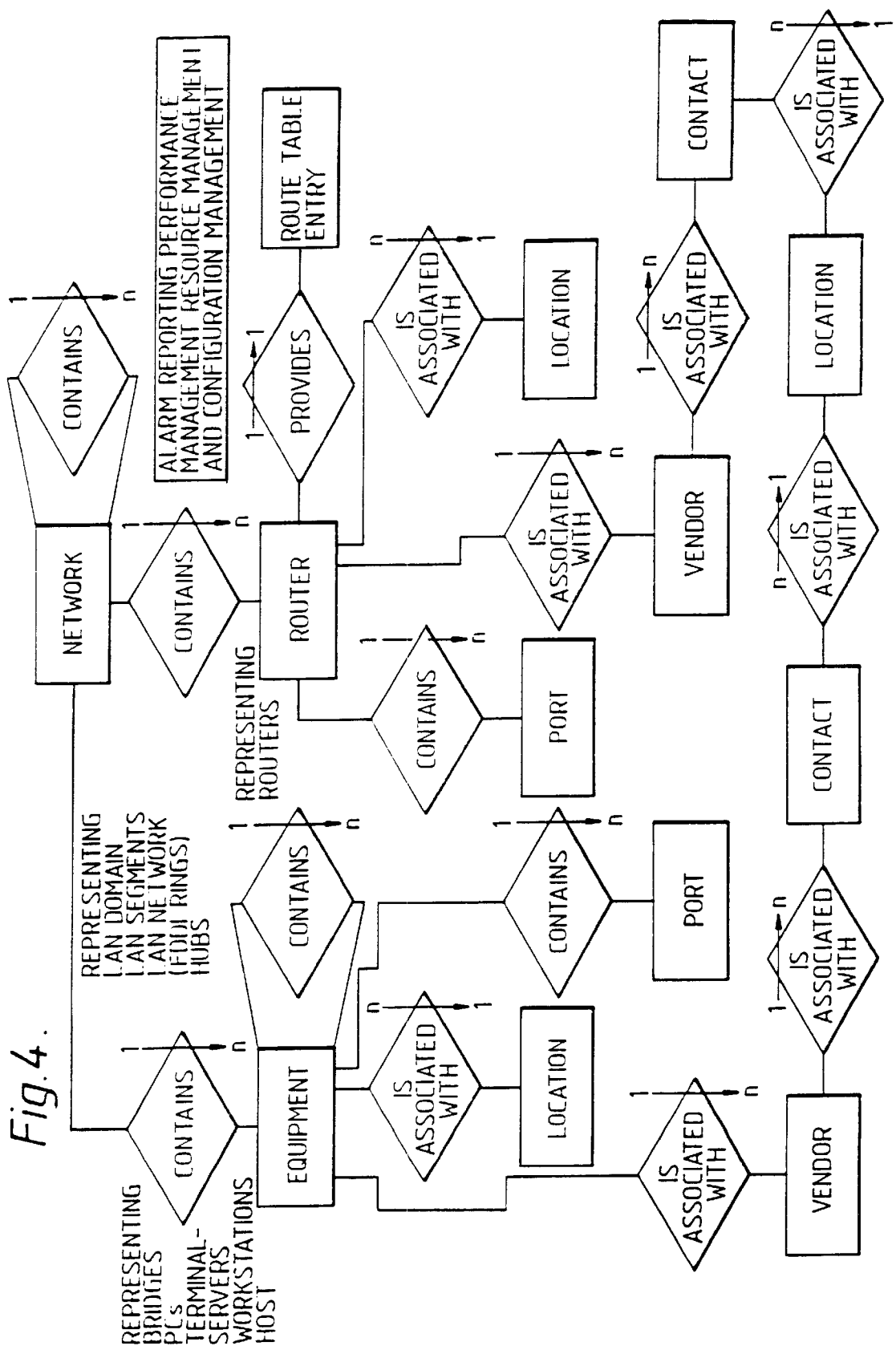
FIG. 4 shows, schematically, a generalised version of FIG. 3.

Whereas FIG. 3 shows a typical example of part of the model, FIG. 4 shows the overall model in a more generalised way. Starting at the top, it will be seen that the managed object class "network" may have links to any number of subsidiary but identical "network" managed object classes. Any network class may itself have links to any number of "equipment" managed object classes, and to any number of "router" managed object classes. The "router" class has links to single class entitled "route table entry", and to any number of "port" classes, each representing an individual wire on one of the routers. The "router class is similarly connected to a "location" class, defining where the individual routers are physically located, and also to a number of "vendor" classes, which define the vendor of each of the routers. Each vendor may have a number of contacts, for example an individual person to be contacted in the event of a problem, and those contacts may themselves be associated with a particular location such as an address or a telephone number.

The rest of the diagram follows in a similar way, and will no doubt be self explanatory.

In the present embodiment, the managed object classes entitled "router", "route table entry" and "port" are new.

The "router" managed object class includes the attributes which are normally associated with the "equipment" class, with a number of additions. These include

| | |
|---|---|
| goodResponseIn | goodResponsesInThreshold |
| goodResponseOut | goodResponsesOutThreshold |
| inAddressErrors | inAddressErrorsThreshold |
| unroutablePackets | unroutablePackets |

These allow a user of the internetwork manager to obtain information on the routers and to set and monitor threshold, traffic and performance alarms. In particular, information or alarms may be obtained in respect of address errors in datagrams forwarded, unroutable packets, unknown protocol packets, error packets in and out, good responses in and out, bytes in and out, and discard packets in and out.

The performance parameters associated with the new "port" managed object class are:

| | |
|---|---|
| bytesin | bytesInThreshold |
| bytesout | bytesOutThreshold |
| discardPacketsIn | discardPacketsInThreshold |
| discardPacketsOut | discardPacketsOutThreshold |
| errorPacketsIn | errorPacketsInThreshold |
| errorPacketsOut | errorPacketsOutThreshold |
| unknownProtocolPackets | UnknownProtocolPacketsThreshold |

Each performance attribute may have three values:

(a) A polling interval that is settable.

(b) A differential value which indicates the change in value of the performance parameter over the given polling interval.

(c) A total value that gives the value of the corresponding SNMP counter for the respective performance parameter.

An attribute change notification is sent on the completion of each polling interval. To allow the reporting of alarms against performance parameters, there is a threshold which is associated with each "performance" attribute. The relevant alarms are transmission alarms with problem type transmissionError, and these are sent when the threshold criteria set for a particular performance for a LAN device has been met. The criteria for each threshold are a set of maximum allowable counts in a given time frame, and a severity level associated with that threshold.

The "port" managed object class also includes the following port attributes which related to configuration management:

| | |
|---|---|
| portControl | portSpeed |
| portForwarding | portPhysicalAddress |
| portIndex | portType |
| portIpAddress | adminState |
| portIpMask | opState |
| | typeText |

A description of these attributes follows:

| | |
|---|---|
| portControl | this allows the port to be switched on or off. |
| portForwarding | this indicates whether the system from/to which traffic is being routed is an end or intermediate system. |
| portIndex | This identifies the port (logical number). |
| portIpAddress | This gives the logical address of the port. |
| portIpMask | This provides the information to interpret the logical address. |
| portPhysicalAddress | This gives the physical address of the port. |
| portSpeed | This provides an estimation of the bandwidth of the link connected to the port. |
| portType | This gives a description of the type of interface at the port. |

The "route table entry" managed object class includes the following attributes:

| | |
|---|---|
| routeAge | routeMask |
| routeControl | routeMetric |
| routeDestination | routeNextHop |
| routeInterfaceIndex | routeProtocol |

A brief description of these attributes is given below:

| | |
|---|---|
| routeAge | This indicates the last time that a packet that traversed the network was received. |
| routeControl | This allows the ports to be switched on and off. |
| routeDestination | This indicates the masked IP address. It gives the network part of the address only. |
| routeInterfaceIndex | This indicates which port on the router is being used. It identifies the port. |
| routeMask | This allows the IP address to be interpreted to give the network address indicated by routeDest attribute. |
| routeMetric | This gives an idea as to the costing of the route. There are give route metrics in SNMP but only one attribute with two values will be used to represent it for management purposes. The first value will indicate the route metric and the second will be the value of that route metric. |
| routeNextHop | This indicates the next IP address on the route. |
| routeProtocol | This indicates which protocol is being used and gives understanding to the route metric. |

As was previously mentioned in connection with FIG. 2, the preferred embodiment provides for a translation by the element manager from SNMP to CMIP.

Figure 5:
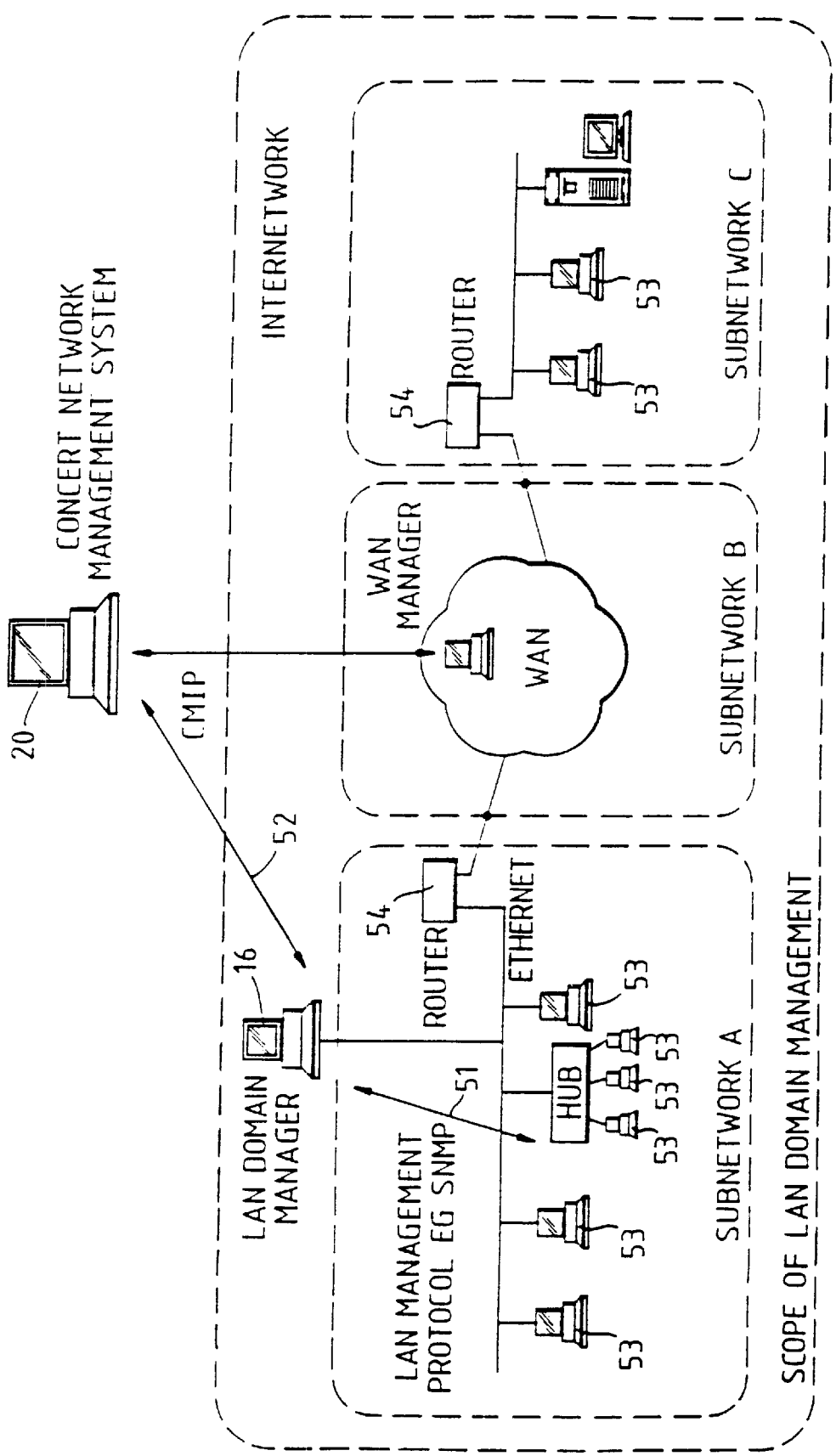
FIG. 5 shows a further schematic view of the internetwork system.

The internetwork system is shown in greater detail in FIG. 5. It can be seen that the network manager 20 comprises a computer terminal of known type loaded with a Concert (TM) Network Management System computer program. The element manager 16 also comprises a computer terminal of known type loaded with and operating a LAN management program. This enables the element manager 16 to communicate with the equipment on its local area networks 10 comprising subnetworks A, B and C. The equipment may include workstations 53, servers, hubs and routers 54.

Communication between equipment in subnetwork A and the element manager 16 is by means of SNMP as represented by arrow 51 whilst communication between the element manager 16 and the network manager 20 is by means of CMIP as represented by arrow 52.

Figure 6:
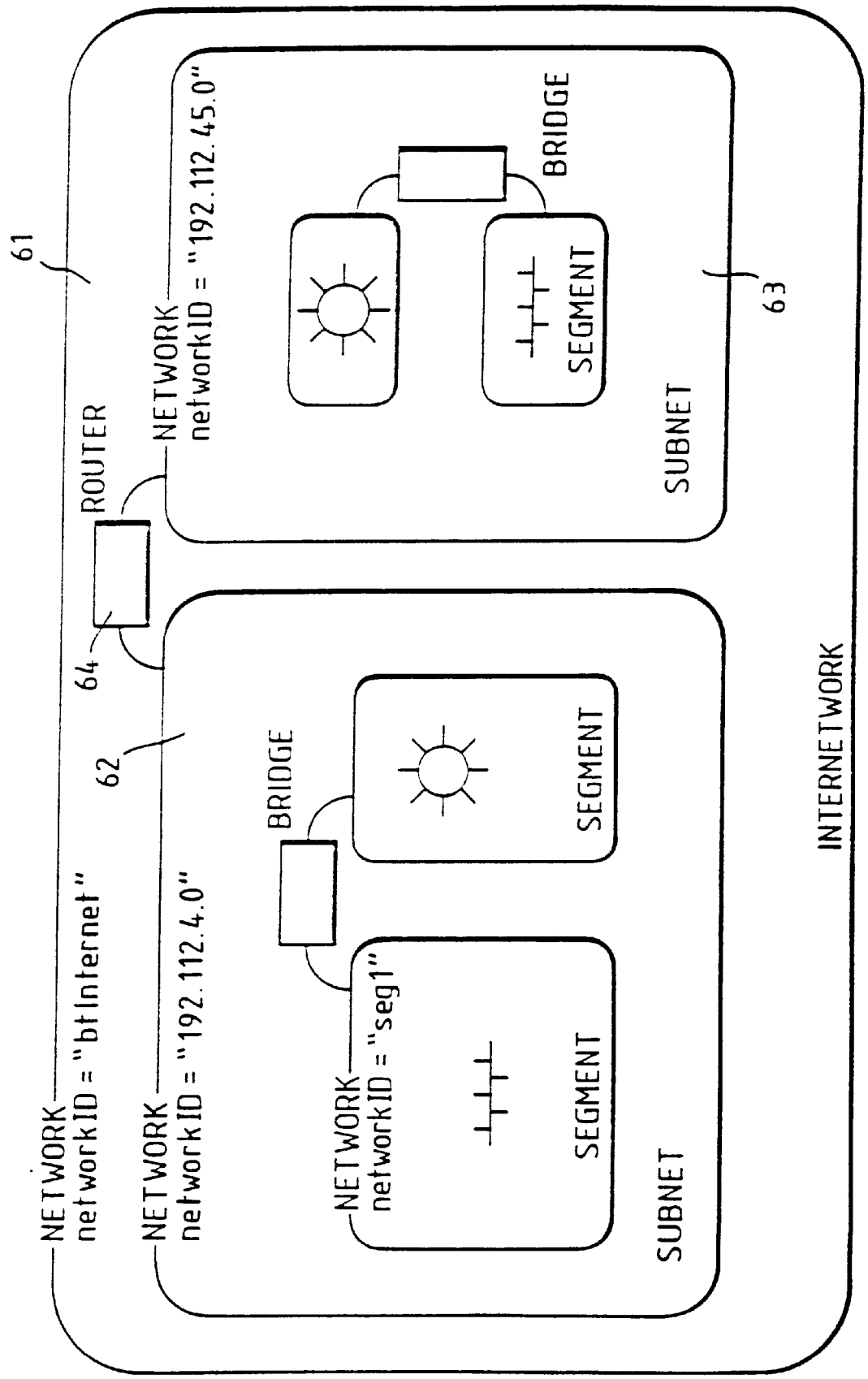
FIG. 6 shows in schematic form a managed object class.

The network manager 20 has a model of the complete internetwork which identifies the local area networks, the internetworking elements such as routers and bridges, and the devices attached to the LANs. The network manager 20 also contains a model of the elements of the wide area network subnetworks. The model is formed as a managed object model and an example of the model is shown in FIG. 6.

It can be seen that the internetwork is given a networkID of "btInternet" 61 and the managed object class containment structure is used to provide an hierarchial network topology. "btInternet" is the top level network managed object instance. This contains all the other networks that is to save those having networkID "192.112.4.0" 62 and "192.112.45.0" 63 and router 64.

"192.112.4.0" and "192.112.45.0" each contain subnetworks. There are logical partitions of the internetwork based on the network addressing scheme.

Figure 7:
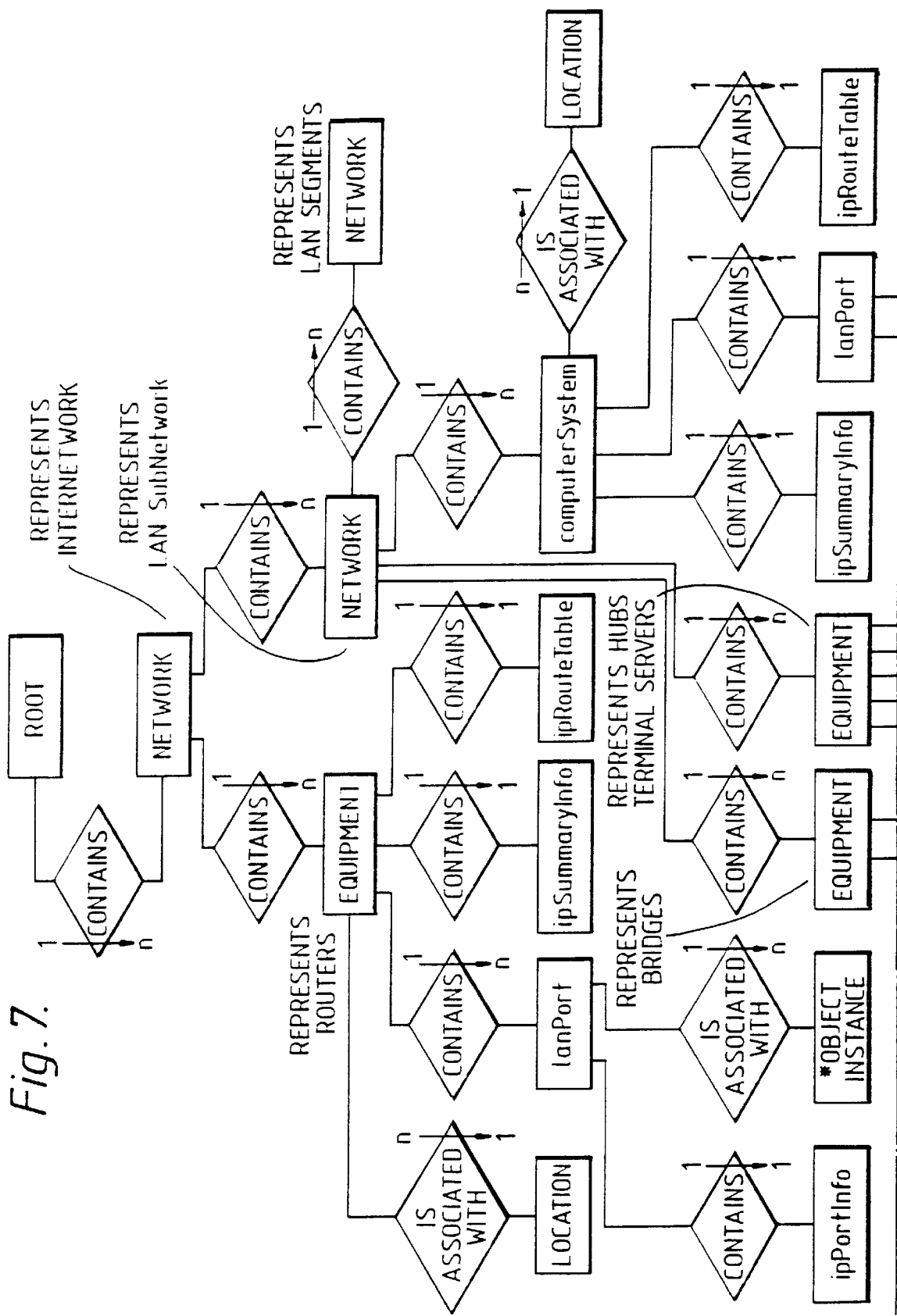
FIG. 7 is an explanatory diagram.
Figure 7:
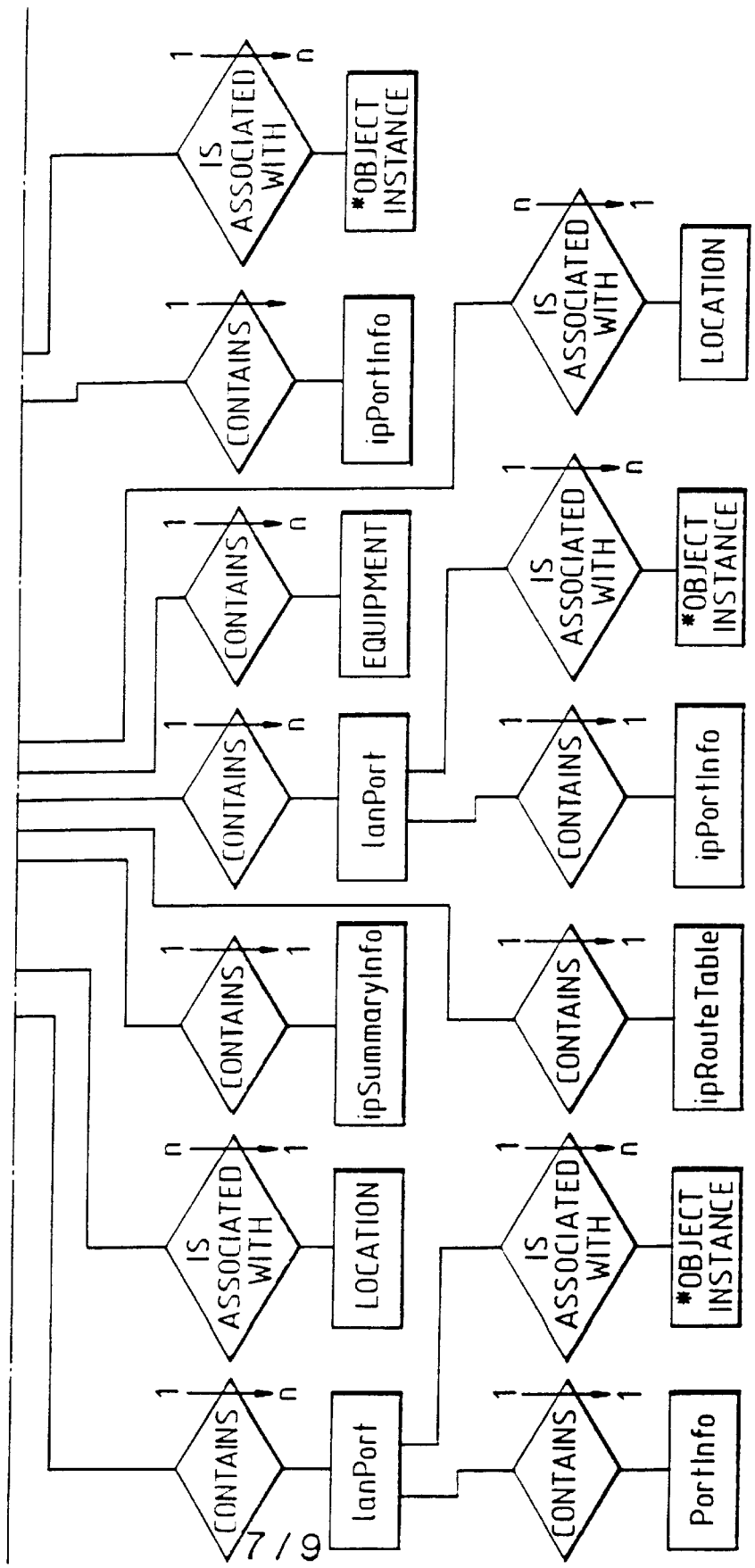

The LAN element manager 16 also provides a model of its associated network which can be thought of as in interface model which is offered to the network manager 20. This model is shown in FIG. 7 by an entity relationship diagram.

The model utilises the following managed object classes as defined in the Network Management Forum Managed Object Library issue 1.1 (which is a collection of managed object instances well known to those skilled in the art):

addValueEventRecord agentCME alarmRecord attributeChangeEventRecord computerSystem deenrolObjectEventRecord enrolObjectEventRecord equipment eventLog eventReportingSieve location network removeValueEventRecord root All mandatory features of each Network Management Forum managed object class are required. In addition, optional attributes are required as will be later described.

The alarmRecord managed object class will hold as attributes all the populated fields of the relevant M-EVENT-REPORT.

The computerSystem managed object class will have the following optional attributes as mandatory attributes.

PeripheralNames:

UpTime; and

UserLabels

The userLabels attribute is used to list the applications that the device supports.

Instances of the equipment managed object class represents the physical components of the network such as bridges, routers, hubs and terminal servers. For this class the following attributes are mandatory:

equipmentType;

functionNames;

networkNames;

productLabel;

serialNumber;

typeText; and userLabels.

For the eventLog managed object class, the following optimal attributes are made mandatory:

capacityAlarmThreshold;

logFullAction; and timeOfLastEntry.

Instances of the location managed object class represent the location of physical aspects of the network and are used for inventory and configuration management purposes. The following optional forum attributes are made mandatory:

typeText; and userLabels.

Instances of the network managed object class are used to represent the internetwork, subnetwork and LAN segments and the optional attribute userLabels is made mandatory.

In order to meet the requirement of LAN management, the model includes subclasses from the Network Management Forum managed object classes equipment and top.

Figure 9:
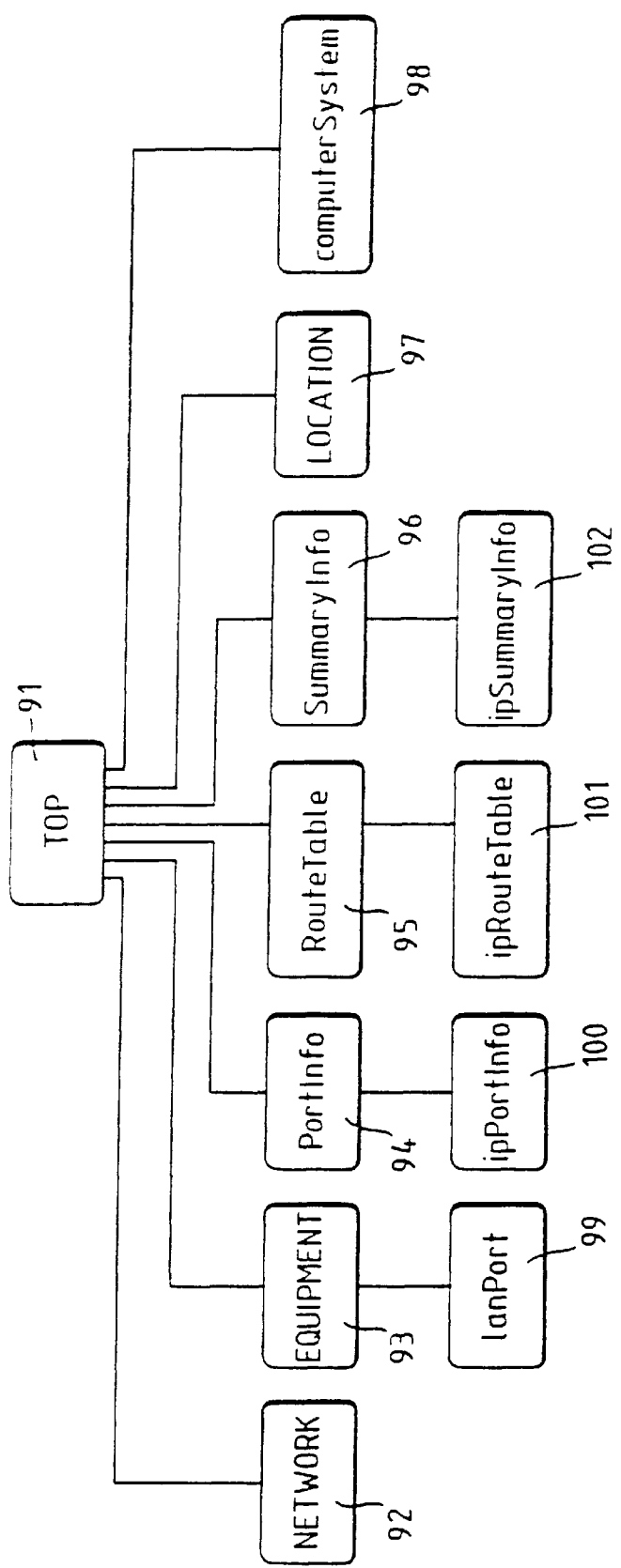
FIG. 9 shows a managed object model class structure used in the internetwork system.

The subclasses are shown in FIG. 9 which depicts an inheritance structure for the LAN Model managed object classes. Thus it will be seen the managed object class top 91 has subclasses network 92, equipment 93, portlnfo 94, routeTable 95, summarylnfo 96, location 97 computerSystem 98 the forum managed object class equipment 93 has a subclass lanport 99 whilst top 91 has the additional subclasses portlnfor 94 and routeTable 95.

In order to cope with protocol specific information, for example Internet Protocol (IP) further subclasses are provided. These are ipPartlnfo managed object class 100, ipRouteTable managed object class 101 and ipSummaryinfo managed object class 102.

The managed object classes have the following behaviour and package specifications.

```
lanPort    MANAGED OBJECT CLASS
  DERIVED FROM "NM Forum Library Vol 1 Supplement":equipment;
  CHARACTERIZED BY lanPortPkg,
       "NM Forum Library Vol 1 Supplement": functionNamesPkg,
       "NM Forum Library Vol 1 Supplement": equipmentTypePkg,
       "NM Forum Library Vol 1 Supplement": networkNamesPkg,
       "NM Forum Library Vol 1 Supplement": typeTextPkg,
       "NM Forum Library Vol 1 Supplement": userLabelsPkg;
REGISTERED AS {?} ;

lanPortPkg    PACKAGE
     BEHAVIOUR lanPortPkgBehaviour;
     ATTRIBUTES
        lanPortIndex            GET,
        lanPortType             GET-REPLACE,
        lanPortSpeed            GET-REPLACE,
        lanPortPhysicalAddress  GET-REPLACE,
        lanPortLastChange       GET,
        lanPortSpecific         GET,
        lanPortLink             GET-REPLACE ADD-REMOVE;

NOTIFICATIONS
        "NM Forum Library Vol 1 Supplement": transmissionAlarm;
;
lanPortPkgBehaviour BEHAVIOUR DEFINED AS  ! This managed object class is used to represent the
physical aspects of an equipment port.  For example the port could
be on a router, a bridge, a workstation, or a computerSystem
object instance.
Port Link loss will be represented by a transmissionAlarm of
problem type linkDown. ;

portInfo portInfo MANAGED OBJECT CLASS
  DERIVED FROM "NM Forum Library Vol 1 Supplement":top;
  CHARACTERIZED BY portInfoPkg;
REGISTERED AS {?} ;

portInfoPkg   PACKAGE
    BEHAVIOUR portInfoPkgBehaviour;
    ATTRIBUTES
    portInfoID    GET,
    inOctets
        PERMITTED VALUES LanDomainModule.LPerCounterRange
        GET,
    outOctets
        PERMITTED VALUES LanDomainModule.LPerCounterRange
        GET,
    inDiscardPackets
        PERMITTED VALUES LanDomainModule.LPerCounterRange
        GET,
```

```
OutDiscardPackets
    PERMITTED VALUES LanDomainModule.LPerCounterRange
    GET,
inErrorPackets
    PERMITTED VALUES LanDomainModule.LPerCounterRange
    GET,
outErrorPackets
    PERMITTED VALUES LanDomainModule.LPerCounterRange
    GET,
inUnknownProtos
    PERMITTED VALUES LanDomainModule.LPerCounterRange
    GET;
;
port InfoPkgBehaviour BEHAVIOUR DEFINED AS    !This managed object class is used to hold the non protocol
specific statistics associated with a lanPort managed object instance. !;

ipPortInfo ipPortInfo MANAGED OBJECT CLASS
    DERIVED FROM portInfo;
    CHARACTERIZED BY ipPortInfoPkg;
REGISTERED AS {?} ;

ipPortInfoPkg PACKAGE
    BEHAVIOUR ipPortInfoPkgBehaviour;
    ATTRIBUTES
        lanPortIndex        GET,
        lanPortIpAddress    GET-REPLACE,
        lanPortIpMask       GET-REPLACE;
;
ipPortInfoPkgBehaviour BEHAVIOUR
```

- 13 -

DEFINED AS   !This managed object class is used to hold the IP protocol specific information associated with a lanPort managed object instance. The lanPortIndex attribute has the same value as the lanPortIndex attribute of the related LanPort managed object instance !;

routeTable routeTable MANAGED OBJECT CLASS
    DERIVED FROM "NM Forum Library Vol 1 Supplement": top;
    CHARACTERIZED BY routeTablePkg;
REGISTERED AS {?} ;

routeTablePkg PACKAGE
BEHAVIOUR routeTablePkgBehaviour;
ATTRIBUTES
    routeTableID GET;
;
routeTablePkgBehaviour BEHAVIOUR ATTRIBUTES
    summaryInfoID GET;

;
summaryInfoPkgBehaviour BEHAVIOUR

DEFINED AS   ! The summaryInfo managed object class is used to represent the non-protocol specific statistical and general information associated with managed object instances representing equipment in the LAN domain.!;

ipSummaryInfo ipSummaryInfoMANAGED OBJECT CLASS
    DERIVED FROM summaryInfo;

- 14 -

```
        CHARACTERIZED BY ipSummaryInfoPkg;
REGISTERED AS {?} ;

ipSummaryInfoPkg PACKAGE
    BEHAVIOUR ipSummaryInfoPkgBehaviour;
    ATTRIBUTES
    ipInDelivers
        PERMITTED VALUES LanDomainModule.LPerCounterRange
        GET,
    ipInAddrErrors
        PERMITTED VALUES  LanDomainModule.LPerCounterRange
        GET,
    ipOutNoRoutes
        PERMITTED VALUES LanDomainModule.LPerCounterRange
        GET,
    ipForwarding
        GET-REPLACE,
    ipInReceives
        PERMITTED VALUES LanDomainModule.LPerCounterRange
        GET,
    ipInHdrErrors
        PERMITTED VALUES LanDomainModule.LPerCounterRange
        GET,
    ipForwDatagrams
        PERMITTED VALUES LanDomainModule.LPerCounterRange
        GET,
    ipInUnknownProtos
        PERMITTED VALUES LanDomainModule.LPerCounterRange
        GET,
    ipInDiscards
        PERMITTED VALUES LanDomianModule.LPerCounterRange
        GET,
    ipOutRequests
        PERMITTED VALUES LanDomainModule.LPerCounterRange
        GET,
```

SUBSTITUTE SHEET (RULE 26)

```
ipOutDiscards
    PERMITTED VALUES LanDomainModule.LPerCounterRange
    GET;
;
ipSummaryInfoPkgBehaviour BEHAVIOUR
```

DEFINED AS ! The ipSummaryInfo managed object class is used to represent the IP specific statistical and general information associated with managed object instances representing routing equipment in the LAN domain. !;

Attribute definitions for the new objects inDiscardPackets inDiscardPackets ATTRIBUTE
    DERIVED FROM "Rec. X.721 | ISO/IEC 10165-2 : 1992": counter;
    BEHAVIOUR inDiscardPacketsBehaviour;
REGISTERED AS {?} ;

inDiscardPacketsBehaviour BEHAVIOUR

DEFINED AS
! This attribute value is a count of the number of inbound packets which were chosen to be discarded even though no errors had been detected to prevent their being deliverable to a higher-layer protocol. !;

inErrorPackets inErrorPackets ATTRIBUTE
    DERIVED FROM "Rec. X. 721 | ISO/IEC 10165-2 : 1992": counter;
    BEHAVIOUR inErrorPacketsBehaviour;
REGISTERED AS {?} ;

inErrorPacketsBehaviour BEHAVIOUR

DEFINED AS
! This attribute value is a count of the number of inbound packets that contained errors preventing them from being deliverable to a higher-layer protocol. ! ;

inOctets inOctets ATTRIBUTE
    DERIVED FROM "Rec. X. 721 | ISO/IEC 10165-2 : 1992": counter;
    BEHAVIOUR inOctetsBehaviour;

- 17 -

REGISTERED AS {?} ;

inOctetsBehaviour BEHAVIOUR

DEFINED AS
! This attribute value is a count of the total number of octets received at the lanPort managed object instance, including framing characters. !;

inUnknownProtos inUnknownProtos ATTRIBUTE
    DERIVED FROM "Rec. X. 721 | ISO/IEC 10165-2 : 1992": counter;
    BEHAVIOUR inUnknownProtosBehaviour;
REGISTERED AS {?} ;

inUnknownProtosBehaviour BEHAVIOUR

DEFINED AS
! This attribute value is a count of the number of packets received via a lanPort managed object instance which were discarded because of an unknown or unsupported pr_tocol. ! ;

ipForwarding ipForwarding ATTRIBUTE
    WITH ATTRIBUTE SYNTAX LanDomainModule.IpForwarding;
    MATCHES FOR EQUALITY;
    BEHAVIOUR ipForwardingBehaviour;
REGISTERED AS {?} ;

ipForwardingBehaviour BEHAVIOUR

DEFINED AS
! This attribute identifies whether the system from/to which traffic is being routed is an end or intermediate system. !;

- 18 - ipForwardAge ipForwardAge ATTRIBUTE
    WITH ATTRIBUTE SYNTAX LanDomainModule.IpForwardAge;
    MATCHES FOR EQUALITY;
    BEHAVIOUR ipForwardAgeBehaviour;
REGISTERD AS {?} ;

ipForwardAgeBehaviour BEHAVIOUR

DEFINED AS
! This is a count, for each route, of the number of seconds elapsed since the last time the route was validated. ! ;

ipForwardDest ipForwardDest ATTRIBUTE
    WITH ATTRIBUTE SYNTAX LanDomainModule.AddressSequence;
    MATCHES FOR EQUALITY;
    BEHAVIOUR ipForwardDestBehaviour;
REGISTERED AS {?} ;

ipForwardDestBehaviour BEHAVIOUR

DEFINED AS
! This attribute identifies, for each route, the destination IP address. ! ;

ipForwardIfIndex ipForwardIfIndex ATTRIBUTE
    WITH ATTRIBUTE SYNTAX LanDomainModule.IpForwardIfIndex;
    MATCHES FOR EQUALITY ;
    BEHAVIOUR ipForwardIfIndexBehaviour;
REGISTERED AS {?} ;

ipForwardIfIndexBehaviour BEHAVIOUR

DEFINED AS
! This attribute identifies, for each route, the lanPort managed object instance through which the next hop of the route should be reached.!;

ipForwardInfo ipForwardInfo ATTRIBUTE
    WITH ATTRIBUTE SYNTAX LanDomainModule.IpForwardInfo;
    MATCHES FOR EQUALITY;
    BEHAVIOUR ipForwardInfoBehaviour;
REGISTERED AS {?} ;

ipForwardInfoBehaviour BEHAVIOUR

DEFINED AS
! This attribute holds specific information related to the particular routing protocol which is responsible for each route. If the information is not present for a route, the entry in this attribute for that route will take a value of OBJECT IDENTIFIER {oo} .!;

ipForwardMask ipForwardMask ATTRIBUTE
    WITH ATTRIBUTE SYNTAX LanDomainModule.AddressSequence;
    MATCHES FOR EQUALITY;
    BEHAVIOUR ipForwardMaskBehaviour;
REGISTERED AS {?} ;

ipForwardMaskBehaviour BEHAVIOUR

DEFINED AS
! This attribute indicates, for each route, the mask to be logically ANDed with the destination address before being compared to the value in the ipForwardDest attribute. !;

– 20 – ipForwardMetric1 ipForwardMetric1 ATTRIBUTE
    WITH ATTRIBUTE SYNTAX  LanDomainModule.ForwardMetric;
    MATCHES FOR EQUALITY, ORDERING;
    BEHAVIOUR ipForwardMetric1Behaviour;
REGISTERED AS {?} ;

ipForwardMetric1Behaviour  BEHAVIOUR

DEFINED AS
! This attribute indicates the primary routing metric for each route. The semantics of this metric are determined by the value of the ipForwardProto attribute. !;

ipForwardMetric2 ipForwardMetric2 ATTRIBUTE
    WITH ATTRIBUTE SYNTAX LanDomainModule.ForwardMetric;
    MATCHES FOR EQUALITY, ORDERING;
    BEHAVIOUR ipForwardMetric2Behaviour;
REGISTERED AS {?} ;

ipForwardMetric2Behaviour  BEHAVIOUR

DEFINED AS
! This attribute indicates the alternative routing metric for each route. The semantics of this metric are determined by the value of the ipForwardProto attribute.!;

ipForwardMetric3 ipForwardMetric3 ATTRIBUTE
    WITH ATTRIBUTE SYNTAX LanDomainModule.ForwardMetric;
    MATCHES FOR EQUALITY, ORDERING;

BEHAVIOUR ipForwardMetric3Behaviour;
REGISTERED AS {?};

ipForwardMetric3Behaviour BEHAVIOUR

DEFINED AS
! This attribute indicates the alternative routing metric for each route. The semantics of this metric are determined by the value of the ipForwardProto attribute. !;

ipForwardMetric4 ipForwardMetric4 ATTRIBUTE
    WITH ATTRIBUTE SYNTAX LanDomainModule.ForwardMetric;
    MATCHES FOR EQUALITY, ORDERING;
    BEHAVIOUR ipForwardMetric4Behaviour;
REGISTERED AS {?} ;

ipForwardMetric4Behaviour BEHAVIOUR

DEFINED AS
! This attribute indicates the alternative routing metric for each route. The semantics of this metric are determined by the value of the ipForwardProto attribute. !;

ipForwardMetric5 ipForwardMetric5 ATTRIBUTE
    WITH ATTRIBUTE SYNTAX LanDomainModule.ForwardMetric;
    MATCHES FOR EQUALITY, ORDERING;
    BEHAVIOUR ipForwardMetric5Behaviour;
REGISTERED AS {?};

ipForwardMetric5Behaviour BEHAVIOUR

DEFINED AS
! This attribute indicates the alternate routing metric for each route. The semantics of this metric are determined by the value of the ipForwardProto attribute. !;

|      |    |
|------|----|
| 1001 | 18 |
| 1010 | 20 |
| 1011 | 22 |
| 1100 | 24 |
| 1101 | 26 |
| 1110 | 28 |
| 1111 | 30 |

Protocols defining policy otherwise must either define a set of values which are valid for this attribute or must implement and integer-instanced policy table for which this attribute's value acts as an index. !;

ipForwardProto ipForwardProto ATTRIBUTE
    WITH ATTRIBUTE SYNTAX LanDomainModule.IpForwardProto;
    MATCHES FOR EQUALITY;
    BEHAVIOUR ipForwardProtoBehaviour;
REGISTERED AS {?} ;

ipForwardProtoBehaviour BEHAVIOUR

DEFINED AS
! This attribute identifies, for each route, which protocol is being used and gives meaning to the route metric. !;

ipForwardType ipForwardType ATTRIBUTE
    WITH ATTRIBUTE SYNTAX LanDomainModule.IpForwardType;
    MATCHES FOR EQUALITY;
    BEHAVIOUR inForwardTypeBehaviour;
REGISTERED AS {?} ;

DEFINED AS

! This attribute identifies, for each route, which protocol is being used and gives meaning to the route metric. !;

ipForwardTypeBehaviour BEHAVIOUR

DEFINED AS
! This attribute identifies for each route its type. !;

ipForwDatagrams ipForwDatagrams ATTRIBUTE
    DERIVED FROM "Rec. X. 721 | ISO/IEC 10165-2 : 1992": counter;
    BEHAVIOUR ipForwDatagramsBehaviour;
REGISTERED AS {?} ;

ipForwDatagramsBehaviour BEHAVIOUR

DEFINED AS
! This attribute is a count of the number of input datagrams for which the containing managed object instance was not their final IP destination as a result of which an attempt was made to find a route to forward them to that final destination. !;

ipInAddrErrors ipInAddrErrors ATTRIBUTE
    DERIVED FROM "Rec. X. 721 | ISO/IEC 10165-2 : 1992": counter;
    BEHAVIOUR ipInAddrErrorsBehaviour;
REGISTERED AS {?} ;

ipInAddrErrorsBehaviour BEHAVIOUR

DEFINED AS

! This attribute value is a count of the number of input datagrams discarded because the IP address in their IP header's destination field was not a valid address to be received. !;

ipInDelivers ipInDelivers ATTRIBUTE
    DERIVED FROM "Rec. X. 721 | ISO/IEC 10165-2 : 1992": counter;

BEHAVIOUR ipInDeliversBehaviour;
REGISTERED AS {?} ;

ipInDeliversBehaviour BEHAVIOUR

DEFINED AS
! This attribute value is a count of the total number of input datagrams successfully delivered to IP user-protocols. !;

ipInDiscards ipInDiscards ATTRIBUTE
    DERIVED FROM "Rec. X. 721 | ISO/IEC 10165-2 : 1992": counter;
    BEHAVIOUR ipInDiscardsBehaviour;
REGISTERED AS {?} ;

ipInDiscardsBehaviour BEHAVIOUR

DEFINED AS
! This attribute value is a count of the number of input IP datagrams for which no problems were encountered to prevent their continued processing, but which were discarded. ! ;

ipInHdrErrors ipInHdrErrors ATTRIBUTE
    DERIVED FROM "Rec. X. 721 | ISO/IEC 10165-2 : 1992" : counter;

BEHAVIOUR ipInHdrErrorsBehaviour;
REGISTERED AS {?} ;

ipInHdrErrorsBehaviour BEHAVIOUR

DEFINED AS
! This attribute value is a count of the number of input datagrams discarded due to error in their IP headers, including bad checksums, version number mismatch, other format errors, etc. !;

ipInReceives ipInReceives ATTRIBUTE
    DERIVED FROM "Rec. X. 721 | ISO/IEC 10165-2 : 1992" : counter;
    BEHAVIOUR ipInReceivesBehaviour;
REGISTERED AS {?} ;

ipInReceivesBehaviour BEHAVIOUR

DEFINED AS
! This attribute value is a count of the total number of input datagrams received including those received in error. !;

ipInUnknownProtocols ipInUnknownProtos ATTRIBUTE
    DERIVED FROM "Rec. X. 721 | ISO/IEC 10165-2 : 1992" : counter;
    BEHAVIOUR ipInUnknownProtosBehaviour;
REGISTERED AS {?} ;

ipInUnknownProtosBehaviour BEHAVIOUR

DEFINED AS
! This attribute value is a count of the number of locally-addressed datagrams received successfully but discarded because of an unknown or unsupported protocol. !;

- 26 - ipOutDiscards ipOutDiscards ATTRIBUTE
    DERIVED FROM "Rec. X. 721 | ISO/IEC 10165-2 : 1992": counter;
    BEHAVIOUR ipOutDiscardsBehaviour;
REGISTERED AS {?} ;

ipOutDiscardsBehaviour BEHAVIOUR

DEFINED AS
! This attribute value is a count of the number of output IP datagrams for which no problem was encountered to prevent their transmission to their destination, but which were discarded. !;

ipOutNoRoutes ipOutNoRoutes ATTRIBUTE
    DERIVED FROM "Rec. X. 721 | ISO/IEC 10165-2 : 1992" : counter;
    BEHAVIOUR ipOutNoRoutesBehaviour;
REGISTERED AS {?} ;

ipOutNoRoutesBehaviour BEHAVIOUR

DEFINED AS
! This attribute value is a count of the number of IP datagrams discarded because no route could be found to transmit them to their destination. !;

ipOutRequests ipOutRequests ATTRIBUTE
    DERIVED FROM "Rec. X. 721 | ISO/IEC 10165-2 : 1992" : counter;
    BEHAVIOUR ipOutRequestsBehaviour;

REGISTERED AS {?} ;

ipOutRequestsBehaviour BEHAVIOUR

- 27 -

DEFINED AS

! This attribute value is a count of the total number of IP datagrams which local IP user-protocols supplied to IP in requests for transmission. !;

lanPortIndex lanPortIndex ATTRIBUTE
  WITH ATTRIBUTE SYNTAX LanDomainModule.LanPortIndex;
  MATCHES FOR EQUALITY;
  BEHAVIOUR lanPortIndexBehaviour;
REGISTERED AS {?} ;

lanPortIndexBehaviour BEHAVIOUR

DEFINED AS
! This attribute identifies the logical number allocated to the lanPort instance. !;

lanPortIpAddress lanPortIpAddress ATTRIBUTE
  WITH ATTRIBUTE SYNTAX LanDomainModule.Address;
  MATCHES FOR EQUALITY;
  BEHAVIOUR lanPortIpAddressBehaviour;
REGISTERED AS {?} ;

lanPortIpAddressBehaviour BEHAVIOUR

DEFINED AS
! This attribute gives the logical IP address of the lanPort managed object instance. !;

lanPortIpMask lanPortIpMask ATTRIBUTE
  WITH ATTRIBUTE SYNTAX LanDomainModule.Address;
  MATCHES FOR EQUALITY;

BEHAVIOUR lanPortIpMaskBehaviour;
REGISTERED AS {?} ;

lanPortIpMaskBehaviour BEHAVIOUR

DEFINED AS
! This attribute provides the information to interpret the logical address. !;

lanPortLastChange lanPortLastChange ATTRIBUTE
    WITH ATTRIBUTE SYNTAX   LanDomainModule.LanPortLastChange;
    MATCHES FOR EQUALITY, ORDERING;
    BEHAVIOUR lanPortLastChangeBehaviour;
REGISTERED AS {?} ;

lanPortLastChangeBehaviour BEHAVIOUR

DEFINED AS

! This attribute identifies the sysUpTime at the time the lanPort managed object instance entered its current operational state. !;

lanPortLink lanPortLink ATTRIBUTE
    WITH ATTRIBUTE SYNTAX   LanDomainModule.LanPortLink;
    MATCHES FOR EQUALITY, SET-COMPARISON, SET-INTERSECTION;
    BEHAVIOUR lanPortLinkBehaviour;

REGISTERED AS {?} ;

lanPortLinkBehaviour BEHAVIOUR

DEFINED AS
! This attribute identifies a combination of the following:

– 29 – an indication of the number of connections that the managed object instance holding this attribute is connected to;

the managed object (classes and) instances, (typically instances of accessPoint or terminationPoint on a WAN, or an instance of lanPort of another LAN device) that the managed object instance holding this attribute is connected to;

whether the connection is a bus connection;

that there is no connection. !;

lanPortPhysicalAddress lanPortPhysicalAddress ATTRIBUTE
    WITH ATTRIBUTE SYNTAX  LanDomainModule.Address;
    MATCHES FOR EQUALTIY;
    BEHAVIOUR lanPortPhysicalAddressBehaviour;
REGISTERED AS {?} ;

lanPortPhysicalAddressBehaviour BEHAVIOUR

DEFINED AS
! This attribute gives the physical address of the lanPort. !;

lanPortSpecific lanPortSpecific ATTRIBUTE
    WITH ATTRIBUTE SYNTAX  LanDomainModule.LanPortSpecific;
    MATCHES FOR EQUALITY;
    BEHAVIOUR lanPortSpecificBehaviour;
REGISTERED AS {?} ;

lanPortSpecificBehaviour BEHAVIOUR

DEFINED AS
! This attribute identifies a reference to definitions specific to the particular media being used to realise the lanPort.!;

lanPortSpeed

- 30 -

SUBSTITUTE SHEET (RULE 26)

lanPortSpeed ATTRIBUTE
    WITH ATTRIBUTE SYNTAX   LanDomainModule.LanPortSpeed;
    MATCHES FOR EQUALITY, ORDERING;
    BEHAVIOUR lanPortSpeedBehaviour;
REGISTERED AS {?};

lanPortSpeedBehaviour  BEHAVIOUR

DEFINED AS
! This provides an estimation of the current bandwidth of the interface connected to the lanPort. For interfaces that do not vary in bandwidth or for those where no accurate estimation can be made this attribute should contain the nominal bandwidth. !;

lanPortType lanPortType ATTRIBUTE
    WITH ATTRIBUTE SYNTAX   LanDomainModule.LanPortType;
    MATCHES FOR EQUALITY;
    BEHAVIOUR lanPortTypeBehaviour;
REGISTERED AS {?};

lanPortTypeBehaviour BEHAVIOUR

DEFINED AS
! This gives a description of the type of interface at the port. !;

outDiscardPackets outDiscardPackets ATTRIBUTE

DERIVED FROM "Rec. X. 721 | ISO/IEC 10165-2 : 1992" : counter;
    BEHAVIOUR outDiscardPacketsBehaviour;
REGISTERED AS {?};

outDiscardPacketsBehaviour          BEHAVIOUR

- 31 -

DEFINED AS

! This attribute value is a count of the number of outbound packets which were chosen to be discarded event though no errors had been detected to prevent their being transmitted. !;

outErrorPackets outErrorPackets ATTRIBUTE
    DERIVED FROM "Rec. X. 721 | ISO/IEC 10165-2 : 1992" : counter;
    BEHAVIOUR outErrorPacketsBehaviour;
REGISTERED AS {?} ;

outErrorPacketsBehaviour BEHAVIOUR

DEFINED AS
! This attribute value is a count of the number of outbound packets that could not be transmitted because of errors. !;
outOctets outOctets ATTRIBUTE
    DERIVED FROM "Rec. X. 721 | ISO/IEC 10165-2 : 1992" : counter;
    BEHAVIOUR outOctetsBehaviour;
REGISTERED AS {?} ;

outOctetsBehaviour BEHAVIOUR

DEFINED AS
! This attribute value is a count of the total number of octets transmitted out of the lanport managed object instance, including framing errors. !;

portInfoID portInfoID ATTRIBUTE

WITH ATTRIBUTE SYNTAX LanDomainModule.PortInfoID;

MATCHES FOR EQUALITY;
BEHAVIOUR portInfoIDBehaviour;

REGISTERED AS {?};

portInfoIDBehaviour BEHAVIOUR

DEFINED AS
! This portInfoID is an attribute type whose value can be used as a relative distinguished name when naming an instance of the portInfo class and its subclasses. !;

routeTableID routeTableID ATTRIBUTE
    WITH ATTRIBUTE SYNTAX  LanDomainModule.RouteTableID;
    MATCHES FOR EQUALITY;
    BEHAVIOUR routeTableIDBehaviour;
REGISTERED AS {?};

routeTableIDBehaviour BEHAVIOUR

DEFINED AS
! This routeTableID is an attribute type whose value can be used as a relative distinguished name when naming an instance of the routeTable class and its subclasses. !;

summaryInfoID summaryInfoID ATTRIBUTE
    WITH ATTRIBUTE SYNTAX  LanDomainModule.SummaryInfoID;
    MATCHES FOR EQUALITY;
    BEHAVIOUR summaryInfoIDBehaviour;
REGISTERED AS {?};

summaryInfoIDBehaviour BEHAVIOUR

- 33 -

DEFINED AS

! This summaryInfoID is an attribute type whose value can be used as a relative distinguished name when naming an instance of the summaryInfo class and its subclasses. !;

Syntax of New Attributes

LanDomainModule {?}

```
DEFINITIONS IMPLICIT TAGS ::=
BEGIN
— IMPORTS
      CircuitBandwidth, Interger16, Name
      FROM FORUM-TYPES-GDMO-1
            {forum modules (0) types-GDMO-1 (8)},
      Count, ObjectInstance
      FROM Attribute-ASN1Module
            {joint-iso-ccitt ms(9) smi (3) part2(2) asn1Module(2)}, NameType
            FROM ASN1DefinedTypesModule
            {ccitt recommendation m gnm (3100)
            informationModel (0)
            asn1Modules (2)
            asn1DefinedTypesModule (0)};

— EXPORTS everything
Address                 ::= GraphicString (SIZE (64))

AddressSequence         ::= SEQUENCE of Address

ForwardMetric           ::= SEQUENCE of CHOICE
                            {
                            none    NULL,
                            metric INTEGER
                            }
```

- 34 -

```
IpForwarding              ::= BOOLEAN -- TRUE reflects forwarding

IpForwardAge              ::= SEQUENCE OF LPerCounterRange

IpForwardIfIndex          ::= SEQUENCE OF ObjectInstance

IpForwardInfo             ::= SEQUENCE OF OBJECT IDENTIFIER

IpForwardNextHop          ::= SEQUENCE OF INTEGER

IpForwardPolicy           ::= SEQUENCE OF INTEGER

IpForwardProto            ::= SEQUENCE OF INTEGER
    {
    other           (0), -- none of the following
    local           (1), -- non-protocol information e.g
                         -- manually configured entries
    netmgnt         (2), -- set via network management protocol
    icmp            (3), -- obtained via ICMP e.g. redirect
    egp             (4),
    ggp             (5),
    hello           (6),
    rip             (7),
    iso10589is-is   (8),
    iso10747is-is   (9),
    iso9542es-is    (10),
    ciscoIgrp       (11),
    bbnSpfIgp       (12),
    ospf            (13),
    bgp             (14), } 0..225
IpForwardType             ::= SEQUENCE OF INTEGER
    }
    other           (0), -- none of the following
    invalid         (1), -- an invalidated route
```

- 35 -

```
                direct          (2), — route to directly connected subnetwork
                indirect        (3), — route to a non-local
                                    — host/network/subnet

} 0..255

LanPortIndex        ::= Integer16

LanPortLastChange   ::= INTEGER..— 32 bit

LanPortLink         ::= SEQUENCE
            {
            noOfEntries INTEGER,
            connections SEQUENCE OF CHOICE
            }
            busConnection       [o] NULL,
            name                [1] Name — NULL reflecting
                                    — 'not connected'
            } 0..1023
        }
LanPortSpecific             ::= OBJECT IDENTIFIER LanPortSpeed                ::= CircuitBandwidth LanPortType                 ::= INTEGER
        {
        other                   (0), — none of the following
            regular1822         (1),
            hdh1822             (2),
            ddn-x25             (3),
            rfc877-x25          (4),
            ethernet – csmacd   (5),
            iso88023 – csmacd   (6),
            iso88024 – tokenBus (7),
            iso88025 – tokenRing (8),
            iSO88026 – man      (9),
            starLan             (10),
```

- 36 -

```
                    proteon - 10Mbit        (11),
                    proteon - 80Mbit        (12),
                    hyperchannel            (13),
                    fddi                    (14),
                    lapb                    (15),
                    sdlc                    (16),
                    dsl                     (17),  -- T-1
                    e1                      (18),  -- european equiv. of T-1
                    basicISDn               (19),
                    primaryISDN             (20),  -- proprietary serial
                    propPointToPointSerial  (21),
                    ppp                     (22),
                    softwareLoopback        (23),
                    eon                     (24),  -- CLNP over IP
                    ethernet-3Mbit          (25),
                    nsip                    (26),  -- XNS over IP
                    slip                    (27),  -- generic SLIP
                    ultra                   (28),  -- ULTRA technologies
                    ds3                     (31) } 0..255

LPerCounterRange          ::= Count {0..42494967295} ..-- 32 bit

PortInfoID                ::= NameType

RouteTableID              ::= NameType

SummaryInfoID             ::= NameType

END
```

Naming

The following name bindings shall be used as defined in the NM Forum Library.

- addValueEventRecord-nb-1

- 37 -

- agentConformantManagementEntity-nb-1
- alarmRecord-nb-1
- attributeChangeEventRecord-nb-1
- computerSystem-nb-2
- deenrolEventRecord-nb-1
- enrolEventRecord-nb-1
- equipment-nb-2
- equipment-nb-3
- eventLog-nb-1
- eventReportingsSieve-nb-1
- location-nb-1
- location-nb-2
- network-nb-1
- network-nb-2
- removeValueEventRecord-nb-1

The following name binding specifications have been defined for the extended specifications.

portInfo-lanPort NAME BINDING
    SUBORDINATE OBJECT CLASS portInfo AND SUBCLASSES;
    NAMED BY
    SUPERIOR OBJECT CLASS lanPort;
    WITH ATTRIBUTE portInfoID;
    CREATE WITH-REFERENCE-OBJECT;
    DELETE ONLY-IF-NO-CONTAINED-OBJECTS;

REGISTERED AS {?} ;

routeTable-equipment NAME BINDING
    SUBORDINATE OBJECT CLASS routeTable AND SUBCLASSES;
    NAMED BY
    SUPERIOR OBJECT CLASS
        "NM Forum Library Vol 1 Supplement": equipment;
    WITH ATTRIBUTE routeTableID;
    CREATE WITH-REFERENCE-OBJECT;
    DELETE ONLY-IF-NO-CONTAINED-OBJECTS;

REGISTERED AS {?} ;

routeTable-computerSystem NAME BINDING

Figure 8:
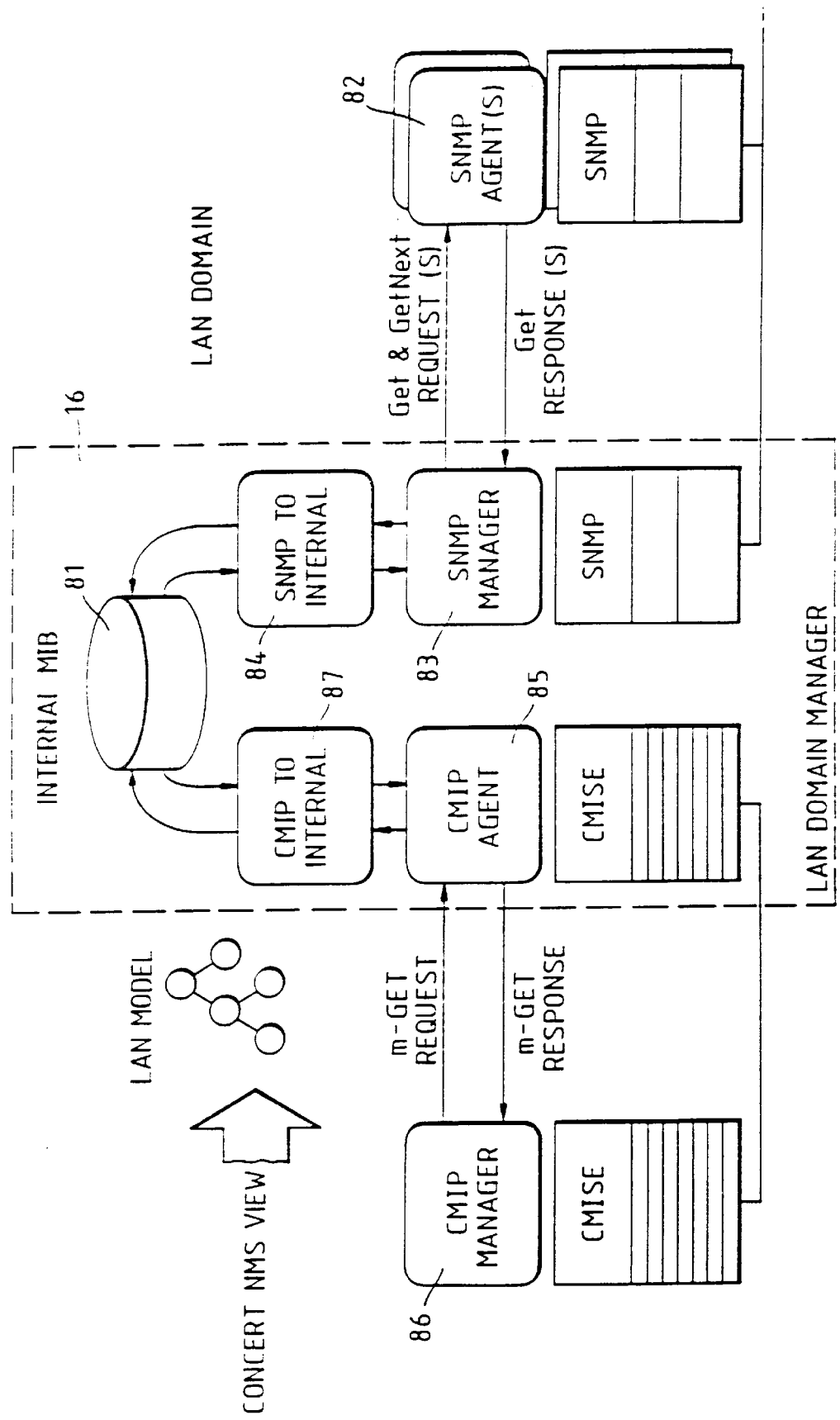
FIG. 8 shows a schematic view of part of the internetwork system.

SUBORDINATE OBJECT CLASS routeTable AND SUBCLASSES;
    NAMED BY
    SUPERIOR OBJECT CLASS
        "NM Forum Library Vol.1 Supplement" : computerSystem;
    WITH ATTRIBUTE routeTableID;
    CREATE WITH-REFERENCE-OBJECT;
    DELETE ONLY-IF-NO-CONTAINED-OBJECTS;

REGISTERED AS {?};

route Table-equipment NAME BINDING
    SUBORDINATE OBJECT CLASS routeTable AND SUBCLASSES;
    NAMED BY
    SUPERIOR OBJECT CLASS
        "NM Forum Library Vol 1 Supplement": equipment;
    WITH ATTRIBUTE routeTableID;
    CREATE WITH-REFERENCE-OBJECT;
    DELETE ONLY-IF-NO-CONTAINED-OBJECTS;

REGISTERED AS {?};

route Table-computerSystem NAME BINDING
    SUBORDINATE OBJECT CLASS routeTable AND SUBCLASSES;
    NAMED BY
    SUPERIOR OBJECT CLASS
        "NM Forum Library Vol 1 Supplement": computerSystem;
    WITH ATTRIBUTE routeTableID;

CREATE WITH-REFERENCE-OBJECT;
    DELETE ONLY-IF-NO-CONTAINED-OBJECTS
    REGISTERED AS {?};

As is shown in figure 8, the LAN element manager 16 stores the LAN model on an internal management information base (MIB) 81 and this model is updated with information received from SNMP agents 82 associated with equipment on the LAN. The information is received by an SNMP manager 83 of the element manager 16 and converted into a form suitable for storage in the internal MIB 81 by conversion means 84.

The element manager 16 includes a CMIP agent 85 which can communicate in CMIP with a CMIP manager 86 of the network manager 20. The CMIP agent 85 can interact with the internal MIB 81 via conversion means 87 which converts the CMIP into the internally used protocol.

The LAN element manager 16 is characterised by the network manager 20 as a model mapper and there is an indirect relationship between the CMIP operations between the LAN element manager 16 and the network manager 20, and the SNMP operations between the LAN element manager 16 and the SNMP operations on its associated LAN. The operations on the LAN may result in changes to the internal MIB 81 which may result in CMIP events been generated. A CMIP M-GET request issued from the CMIP manager 86 will be serviced by the CMIP agent 85 by referring to the objects defined in the LAN object model stored in the internal MIB 81 via the conversion means.

If the SNMP manager 83 receives knowledge of a new device on the LAN, the MIB 81 will be updated leading to the generation of CMIP Enrol M-EVENT-REPORTS which are sent to the network manager 20. In this way the network manager 20 is made aware of new devices on the LAN (or reactivation of the previous devices) and an auto-discovery feature of the element manager 16 can be utilised by the network manager 20.

In the other direction, a Scoped M-GET request from the network manager 20 would be translated into a whole series of SNMP GetRequests and GetNextRequests as the element manager 16 attempts to obtain the latest SNMP MIB values from all the devices it manages on its LAN.

CMIP events will relate to the LAN or software applications running on the LAN.

The status of LAN devices will be conveyed to the network manager 20 the status being whether the devices are "up", "down" or "going down". The devices also indicate port link loss or loss of service from peer LANs or LAN devices.

The LAN device administrative and operational states are given by two attributes in the MIB 81. These are operationalState and administrativeState. Attribute Change Notifications will provide indication of changes in any of the states of the instances.

In order to indicate a port link loss the lanPort managed object class is used. This is derived from the equipment managed object class and provides the ability to send an alarm against the particular part on the LAN device that it represents. The loss will be indicated by the transmissionAlarm event type.

Software applications running on devices on the LAN will generate M-EVENT-REPORTS. For example, when an application is started for the first time in a real computing resource, the LAN element manager 16 will detect this and create a new userLabels entry in the corresponding managed object instance, computerSystem. The CMIP agent 85 will then send an addValue M-EVENT-REPORT to the network Manager 20. When an application is removed from the computing resource this will be indicated by the deletion of the corresponding userLabels entry in the MIB 81 and the sending of a removeValue M-EVENT-REPORT to the network manager 20 by the CMIP agent 85.

If an application listed in the userLabels should fail and this is detected by the LAN element Manager 16, then it will send an M-EVENT-REPORT to the network manager 20 with the following attributes assigned:

| | |
|---|---|
| eventType: | processingAlarm |
| problemType: | sfwrEnvironmentalProblem |
| severity: | major |
| problemText: | "application <applicationName> has failed" (where applicationName is the application name) |

Subsequently, if the application becomes functional again and this is detected by the LAN element manager 16, then it will send an M-EVENT-REPORT to the network manager 20 with the following attributes assigned:

| | |
|---|---|
| eventType: | processingAlarm |
| problemType: | sfwrEnvironmentalProblem |
| severity: | clear |
| problemText: | "application <applicationName> has restarted" |

The LAN element manager 16 may issue a SNMP GetRequest to the SNMP Agent 82. If for some reason the SNMP Agent 82 does not respond to the request an M-EVENT-REPORT is sent to the network manager 20 with the following attribute values set:

| | |
|---|---|
| eventType: | equipmentAlarm |
| problemType: | noResponse |
| severity: | critical |
| problemText: | "no response to poll" |

This equipmentAlarm will be sent against the equipment manager object instance representing the LAN device that is not responding to the network manager 20. The operationsState attribute will be set to disabled on the MIB 81 and an attributeChange notification will be sent to the network manager 20 by CMIP agent 85.

If during a later polling attempt by the LAN element manager 16, the device responds then a further M-EVENT-REPORT will be sent by the element manager 16 to the network manager 20 with the following attribute values set:

| | |
|---|---|
| eventType: | equipmentAlarm |
| problemType: | noResponse |
| severity: | clear |
| problemText: | "device responded to poll" |

The various SNMP Traps generated on the LAN will generate event reports. The SNMP Traps include:

| | |
|---|---|
| coldStart | which indicates that the SNMP agent is reinitialising itself such that the agent's configuration or protocol implementation may be altered; |
| warmStart | which indicates that the SNMP agent is reinitialising itself but neither the agent's configuration or protocol implementation will be altered; |
| linkDown | which indicates that the sending SNMP agent recognises a failure in one of its communication links; |

| | |
|---|---|
| linkUp | which indicates that the sending SNMP agent recognises that on of its communications links has come up; |
| authentication-Failure | which indicates that the SNMP agent has received an SNMP message that was not properly authenticated. This is a security device and is sent when an unauthorised attempt to access or change the LAN device is made. It can be triggered by the use of an incorrect password or community string/name. The emission of this Trap can be switched "on" or "off" for some LAN devices; |
| egpNeighbor-Loss | which indicates that an Exterior Gateway Protocol neighbour is not reachable and the relationship no longer exists; |
| enterprise - Specific | which indicates that the SNMP agent recognises an enterprise specific event has occurred. The particular event will be identified within the message. This allows the use of non-standard proprietary Traps, that are defined in the MIB extensions for a particular LAN device. The enterpriseSpecific Trap contains a number that identifies the nature of the particular event that has occurred. |

The information from these Traps will be mapped to the network manager 20 by the element manager 16 in a manner which will now be described.

Let us suppose that a coldStart Trap is received from the SNMP agent 82 by the network manager 20 indicating that either there is a new device or that a device that is known has been reinitialised.

If it is a new device, then it will not be known to the element manager 16 and not be modelled on the MIB 81. A new instance will be created on the MIB 81 to represent the device and an enrol M-EVENT-REPORT sent from the CMIP agent 85 to the CMIP manager 86 of the network manager 20 to make it aware of the new device.

If the device is known and there is an alarm or alarms against the managed object instance that represents it, then it can be assumed that the alarms should be cleared. An M-EVENT-REPORT is then sent to the network manager as before but with attributes:

| eventType: | equipmentAlarm |
|---|---|
| problemType: | *this will be the same as the alarm or alarms raised to indicate the original fault condition(s) which this alarm now clears* |
| severity: | clear |
| problemText: | "SNMP coldStart Trap reported" |

If a coldStart Trap is received from a known LAN device and there is no outstanding alarm or alarms already against the managed object instance that represents it, then an M-EVENT-REPORT is sent to the network manager 20 with the following attributes assigned:

| eventType: | equipmentAlarm |
|---|---|
| problemType: | unspecified |
| severity: | Warning |
| problemText: | "SNMP coldStart Trap reported" |

If the LAN device has been reinitialised following a fault then the operationalState attribute of the corresponding LAN Model managed object instance may have previously seen set to disabled. Therefore is the coldStart means the device has re-initialised, it is also assumed that the operationalState attribute value can be changed to enabled in the Internal MIB 81. An attribute change notification to indicate the change will then be sent to the network manager 20.

The warmStart Trap will be treated in exactly the same manner as the coldStart Trap.

If a linkDown Trap is sent by the LAN SNMP Agent 82 to the element manager 16, the manager 16 will determine which lanPort Managed object instance corresponds to the Trap. A CMIP M-EVENT-REPORT will be sent against the relevant lanPort instance to the CMIP manager 86 of the network manager 20, with the following attributes assigned:

| eventType: | transmissionAlarm |
|---|---|
| problemType: | linkDown |
| severity: | critical |
| problemText: | "SNMP linkDown Trap reported" |

The linkDown Trap causes the operationalState attribute of the corresponding lanPort managed object instance to go to disabled value. an attribute change notification will then be sent to the network manager 20.

If a linkUp Trap is sent by an SNMP Agent 82 to the element manager 16, the element manager 16 will determine which lanPort Managed object instance corresponds to the Trap. A CMIP M-EVENT-REPORT will be sent against the relevant lanPort instance with the following attributes assigned:

| | |
|---|---|
| eventType: | transmissionAlarm |
| problemType: | linkUp |
| severity: | clear |
| problemText: | "SNMP linkUp Trap reported" |

If a linkDown Trap had previously been sent against the lanPort, managed object instance then the linkUp Trap serves as a clear for the alarm condition caused by the linkDown Trap. The operationalState attribute value changes to enabled and an attribute change notification will be sent against the lanPort managed object instance.

If a linkUp Trap is received and there is no existing or outstanding linkDown Trap to which it corresponds then a CMIP M-EVENT-REPORT will be sent against the relevant lanPort instance with the following attributes assigned:

| | |
|---|---|
| eventType: | transmissionAlarm |
| problemType: | unspecified |
| severity: | Warning |
| problemText: | "linkUp Trap reported with no outstanding SNMP linkDown Trap" |

Some common makes of LAN equipment for example, Cisco routers, when they are switched on or rebooted, will send only the coldStart Trap followed by linkUp Traps for each port. Thus, it is possible for the linkUp Trap to be received when the equipment is first installed or when the equipment has reinitialised and no previous linkDown Trap has been received.

If an authenticationFailure Trap is sent by the SNMP Agent 82 to the element manager 16, the manager will determine which equipment or computerSystem managed object instance corresponds to the Trap. A CMIP M-EVENT-REPORT will be sent against the relevant instance to the CMIP manager 86 with the following attribute values assigned:

| | |
|---|---|
| eventType: | environmentalAlarm [sensor alarm] |

45

| | |
|---|---|
| problemType: | instrusionDetection |
| severity: | Warning |
| problemText: | "SNMP authentication failure Trap reported from <authAddr>" |

The part of the problemText attribute marked <authAddr> should be used to identify the apparent address which was the source of the attempted intrusion.

If an egpNeighborLoss Trap is sent by the SNMP Agent 82 to the element manager 16, the manager will determine which equipment or computerSystem managed object instance corresponds to the Trap originator. The element manager 16 will also determine from the variable bindings the address of the neighbouring device from which association has been lost. A CMIP M-EVENT-REPORT will be sent against the relevant instance to the CMIP manager 86 with the following attribute values assigned:

| | |
|---|---|
| eventType: | equipmentAlarm |
| problemType: | externalIFDeviceProblem |
| severity: | critical |
| problemText: | "SNMP EGP neighbour loss Trap reported from <egpNeighAddr>" |

The part of the problemText attribute marked <egpNeighAddr> should be used to identify the address of the other router from which association has been lost.

If an enterpriseSpecific Trap is sent by the SNMP Agent 82 to the element manager 16 it will determine which equipment or computerSystem managed object instance corresponds to the Trap originator. The element manager 16 may also determine from the variable bindings the precise meaning associated with the Trap.

A CMIP M-EVENT-REPORT will be sent to the CMIP manager 86 against the relevant instance with the following attribute values assigned:

| | |
|---|---|
| eventType: | equipmentAlarm |
| problemType: | unspecified |
| severity: | indeterminate |
| problemText: | "SNMP enterprise specific Trap <Generic-Trap> <Specific-Trap> reported" |

It will now be readily appreciated that the element manager 16 acts in the manner of a protocol mapper. The network manager 20 holds in a data store (not shown) inventory details if the equipment modelled on the network providing the user with a knowledge of the physical aspects of the network. For example, the attribute values of the equipment and computerSystem managed object classes may be sourced using information available form the SNMP MIB-II groups. For example, the attribute productLabel is derived from the SNMP MIB-II object sysObjectID and the typeText attribute of the equipment managed object class is derived from the SNMP object sysDescr.

Network performance will be of interest to the user of the network manager 20 and the relevant information will be passed to it by the element manager 16. This will enable the detection of congestion and potential problems on the network.

Network performance parameters include the octets in and out of particular ports, the number of unknown protocol packets received on a part, errored packets in and out of a port and incoming and outgoing packets discarded at a port.

The portInfo managed object class has an attribute inOctets which is derived from the SNMP object ifInOctets. The outErrorPackets attribute is derived from ifOutErrors.

Other performance parameters may relate to the Internet Protocol IP. For example, the total input IP packets because of an invalid address in their Reader or the total input IP packets discarded though not in error. These parameters are modelled as counter attributes in the relevant managed object class, ipSummaryInfo with attribute ipInDelivers being derived from the ipInDelivers SNMP object and ipOutRequests being derived from the ipOutRequests SNMP object.

What is claimed is:

1. An internetwork system having a plurality of interlinked networks, an individual network manager for each of said networks, and an internetwork manager, wherein at least one of said individual network managers comprises:

a database;

a manager component arranged to communicate in a first network management protocol with at least one element of a network corresponding to the one of said individual network managers, where said manager component communicates with the database using an internal protocol;

an agent component arranged to communicate with the internetwork manager in a second network management protocol; and a converter located in a path between the database and the agent component, said converter arranged to convert from the second network management protocol to the internal protocol used with the database;

wherein the internetwork manager is arranged to allow an internetwork operator to issue a command at the internetwork manager to control an element of one of said interlinked networks.

2. An internetwork system as claimed in claim 1 wherein the control of the element of one of said interlinked elements is to present at the internetwork manager information on the status, configuration or performance of the element.

3. An internetwork system as claimed in claim 1, in which said at least one individual network managers further comprise a second converter located in path between the database and the manager component, said second converter arranged to convert between the first network management protocol and the internal protocol used with the database.

4. An internetwork system as claimed in claim 1, in which the internetwork manager includes a database model of the internetwork, the model being arranged according to the second network management protocol.

5. An internetwork system as claimed in claim 1, in which the first network management protocol is a Simple Network Management Protocol (SNMP).

6. An internetwork system as claimed in claim 1, in which the second network management protocol is a Common Management Information Protocol (CMIP).

7. An internetwork manager system as claimed in claim 1, in which said at least one individual network manager is arranged to create software objects in the database and to report the creation of said objects to the internetwork manager.

8. An internetwork system as claimed in claim 7, in which said at least one individual network manager is arranged to report the creation of software objects to the internetwork manager in a form of CMIP Enrol M-EVENTS REPORTS.

9. An internetwork system as claimed in claim 1, in which said at least one individual network manager is arranged to convert traps received from an associated network into CMIP M-EVENT REPORTS for transmission to the internetwork manager.

10. A method for managing an internetwork having a plurality of interlinked networks, where each network has an individual network manager, and an internetwork manager, wherein the method comprises the following steps:

a. communicating information regarding the status of an element on one the networks to the respective individual network manager using a first network management protocol;

b. maintaining a database at the individual network manager, where the database models the elements on the network and the database uses an internal protocol;

c. issuing a command by the internetwork manager to control the element in the network, where the command is in a second network management protocol used by the internetwork manager;

d. receiving the command at the individual network manager and translating the command from the second network management protocol to the internal protocol used by the database;

e. interrogating the database regarding the element of the network that is the subject of the command;

f. in response to the translated command, providing information to the internetwork manager regarding the status, configuration or performance of the element.

* * * * *